United States Patent
Boess et al.

(10) Patent No.: US 6,414,304 B1
(45) Date of Patent: Jul. 2, 2002

(54) METHOD AND APPARATUS FOR DETERMINING THE POSITION OF A WHEEL MOUNTED ON A VEHICLE

(75) Inventors: Walter Boess, Gross-Rohrheim (DE); Simone Longa, Arcisate (IT)

(73) Assignee: Hofmann Werkstatt-Technik GmbH, Pfungstadt (DE)

( * ) Notice: Subject to any disclaimer, the term of this patent is extended or adjusted under 35 U.S.C. 154(b) by 0 days.

(21) Appl. No.: 09/065,574

(22) Filed: Apr. 24, 1998

(30) Foreign Application Priority Data

Apr. 25, 1997 (DE) .......................................... 197 17 569

(51) Int. Cl.[7] .................................................. G01D 5/34
(52) U.S. Cl. .............................. 250/231.13; 356/139.09
(58) Field of Search ........................ 250/231.13, 231.14, 250/559.29, 559.3, 559.31; 356/375, 5.01, 139.09, 155, 152.1; 73/862.01; 33/288; 700/279; 702/95

(56) References Cited

U.S. PATENT DOCUMENTS

| | | | |
|---|---|---|---|
| 4,745,469 A | * 5/1988 | Waldecker et al. ........... 348/94 |
| 5,268,731 A | * 12/1993 | Fuchiwaki et al. ..... 356/139.09 |
| 5,540,108 A | * 7/1996 | Cook et al. ............... 73/862.01 |
| 5,731,870 A | * 3/1998 | Bartko et al. .......... 356/139.09 |
| 5,818,574 A | * 10/1998 | Jones et al. ............ 356/139.09 |

\* cited by examiner

*Primary Examiner*—Que T. Le
*Assistant Examiner*—Thanh X. Luu
(74) *Attorney, Agent, or Firm*—Pillsbury Winthrop LLP

(57) ABSTRACT

A method and an apparatus for determining the position of a wheel mounted on a vehicle, wherein at least two target locations on the wheel are irradiated by a transmitter from a given location. The beams are reflected at the target locations and received by a receiver at a given location. The wheel position is ascertained from the measurement values produced by that arrangement, with signals associated with the respective target locations being emitted at given times and the periods of time from emission to reception of the signals reflected at the respective target locations being measured so the wheel position is determined from the measured times.

9 Claims, 1 Drawing Sheet

METHOD AND APPARATUS FOR DETERMINING THE POSITION OF A WHEEL MOUNTED ON A VEHICLE

FIELD OF THE INVENTION

The invention concerns a method and apparatus for determining the position of a wheel mounted on a motor vehicle.

BACKGROUND OF THE INVENTION

A method of determining the position of a wheel mounted on a vehicle, wherein at least two diametrally disposed targets on the wheel which are associated with a given wheel position angle are irradiated from a transmitter, and the beams reflected by the target locations on the wheel are received by a receiver and wherein the beam transit times from emission to reception are measured, and an apparaus for carrying out such a method, are to be found in EP 0 581 990 A1. In that arrangement, light transmitting and receiving means are disposed on a rotary disk which, during a measurement procedure, is rotated about an axis which coincides with the axis of the wheel whose position is to be determined, in such a way that various points on the wheel are irradiated by the transmitted light, and the light reflected at such points is received again. In that procedure, the transit times of the beams associated with the respective irradiation points on the wheel are measured and recorded in an approximately sinusoidal curve. The irradiation points which are at 0° and 180° respectively afford a measurement value in respect of the track of the wheel while the irradiation points which are disposed at 90° and 270° respectively afford a measurement value in respect of wheel camber.

EP 0 280 941 B1 discloses projecting a geometrically structured light pattern on to the wheel whose position is to be determined, receiving that reflected light pattern as an image and using the geometrical shape of the received image to determine the relative position of the surface of the wheel in three-dimensional space and to ascertain therefrom the predetermined orientation characteristic of the wheel. In that procedure the position of the wheel on the vehicle is determined from the geometrical data of the received image, using known position-determining means, as are to be found in U.S. Pat. No. 4,111,557 and German laid-open application (DE-OS) No 25 14 930.

SUMMARY OF THE INVENTION

An object of the present invention is to provide a method of determining the position of a wheel mounted on a motor vehicle, in which the position of the wheel mounted on the motor vehicle can be determined irrespective of the optical image reproduction of the light pattern which is projected on to the wheel.

Another object of the present invention is to provide a method of determining the position of a wheel mounted on a motor vehicle, which can afford reliable and accurate measurement results while involving an operating procedure that is simple to carry into effect.

Still another object of the present invention is to provide a method of determining the position of a wheel mounted on a motor vehicle, involving operational procedures that can be implemented by uncomplicated structure.

Still a further object of the present invention is to provide an apparatus for determining the position of a wheel mounted on a vehicle, which can give accurate measurement results while not involving an over-complicated structure.

In accordance with the principles of the present invention the foregoing and other objects are attained by a method of determining the position of a wheel mounted on a motor vehicle, wherein at least first and second diametral target locations on the wheel, which are associated with a given wheel position angle, are irradiated from a transmitter, and the beams reflected by the target locations on the wheel are received by a receiver. The beam transit times from emission to reception are measured. The at least first and second diametral target locations are irradiated from a given location with spatially predetermined irradiation and reflection directions, and the reflected beams are received at a given location. The wheel position angle is determined from the given positions of the transmitter and the receiver, the predetermined irradiation and reflection directions, and the measured beam transit times.

In the apparatus aspect, the foregoing and other objects of the invention are attained by an apparatus for determining the position of a wheel mounted on a vehicle, comprising a transmitter for emitting beams towards at least first and second target locations on the wheel, which are associated with a wheel angle position. The apparatus includes a receiver for receiving the beams reflected by the target locations, a time measuring means for measuring the beam transit times from emission to reception and an evaluation means for evaluating the measurement values, thereby to determine the position of the wheel. The transmitter and the receiver are arranged at given positions and the transmitter emits first and second beams on to diametral target locations involving a given spatial orientation. The evaluation means is operable to determine the wheel position angle from the positions of the transmitter and the receiver, the directions of the beams and the beam transit times.

It will be seen therefore that, to determine the position of a wheel mounted on a motor vehicle, at least two target locations on the wheel are irradiated from a respective given location which is stationary at least during the measuring procedure and which thus constitutes a transmitter. The beams are reflected by the target locations and received at a respective given location which is stationary at least during the measuring procedure and which thus constitutes the receiver. The wheel position is determined from the measurement values which are obtained in that way. The signals associated with the respective target locations are emitted at given moments in time and the periods of time from emission to reception of the signals which are reflected at the respective target locations are measured. The wheel position is ascertained from the measured periods of time, with the measuring device being in the form of a time measuring device for measuring the period from the moment of emission of the respective signal associated with a target location, to the moment of reception of that signal.

The signals involved are preferably signals which are emitted for a brief period of time and which are of a given signal shape so that an association is afforded as between the emitted signal and the received signal, for time measurement purposes. The radiation involved is preferably electromagnetic radiation which can be suitably reflected at the surface of the wheel in the region of the disk portion thereof and/or at the surface of the tire bead. The radiation can also be in the visible wavelength range.

At least first and second target locations which are at an angular spacing from each other about the axis of the wheel, on the wheel surface, are irradiated. For the purposes of ascertaining the camber of the wheel, for example target locations which are disposed on the wheel in diametral relationship in a vertical plane passing through the axis of the wheel can be irradiated. For the purposes of ascertaining the wheel tracking, target locations disposed in a horizontal plane passing through the axis of the wheel can be irradiated.

In order to arrive at a suitable association between the emitted and received signals for the purposes of time measurement, the signals can involve different signal sequences or different frequencies. It is also possible to transmit given codings with the carrier frequency, and to measure the time that the coding requires from the moment of emission to the moment of reception.

Further objects, features and advantages of the invention will be apparent from the following description of a preferred embodiment thereof.

DESCRIPTION OF THE PREFERRED EMBODIMENT

Figure 1:
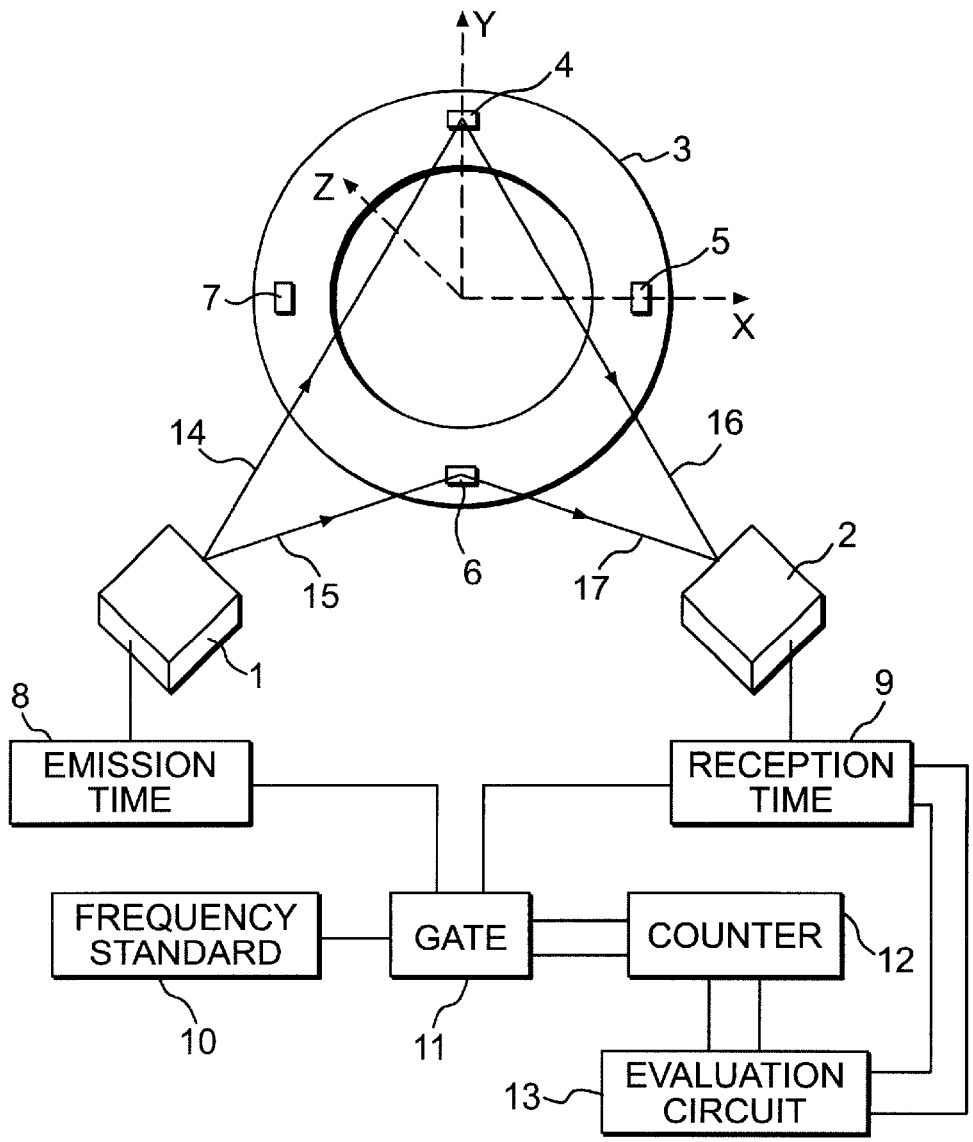
FIG. 1 diagrammatically shows a measuring apparatus as an embodiment of the invention.
Figure 2:
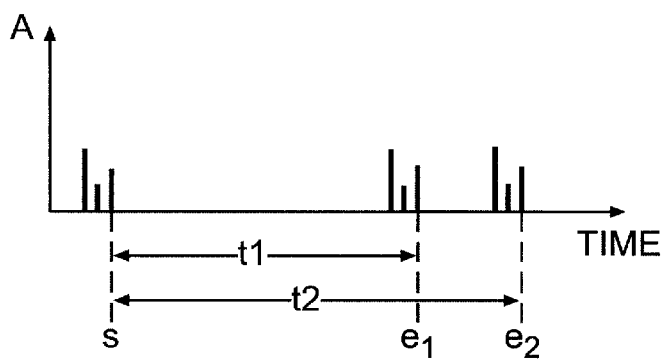
FIG. 2 is a diagrammatic representation of time measurement.

Referring firstly to FIG. 1, reference numeral 3 therein denotes a wheel and more especially a motor vehicle wheel whose position is to be determined, being mounted on a vehicle (not shown). To determine the camber angle of the wheel 3, first and second target locations 4 and 6 disposed at diametrally opposite locations in a vertical plane passing through the axis of the wheel are suitably irradiated. Furthermore, for determining the track angle of the wheel, provided on the wheel are a further pair of diametrally oppositely disposed target locations 5 and 7 which are in a horizontal plane also extending through the axis of the wheel. In the ideal situation, the outside of the wheel, on which the target locations 4 through 7 are provided, is parallel to or coincident with a plane defined by the x- and y-co-ordinate axes. The wheel axis which extends perpendicularly thereto is disposed on the z-co-ordinate axis. The target locations 4 through 7 can be arranged at equal angular spacings, for example 90° angular spacings, about the wheel axis or the above-indicated z-co-ordinate axis. The target locations 4 through 7 can each be formed by reflective markings but they may also be determined solely by virtue of the fact that beams emitted by a sender or transmitter as diagrammatically indicated at 1 in FIG. 1 impinge on the outside surface of the wheel at the specified target locations 4, 5, 6 and 7 respectively, with the outside surface of the wheel being reflective in relation to those beams. FIG. 1 shows two beams 14 and 15 which are emitted by the transmitter 1 and which are directed on to the target locations 4 and 6 for determining the camber angle of the wheel 3. The two beams 14 and 15 are thus reflected at the target locations 4 and 6 to constitute reflected beams 16 and 17 which are then received by a suitable receiver as diagrammatically indicated at 2. The two emitted beams 14 and 15 can be emitted at the same moment in time. A suitable measuring device 8 is connected to the transmitter 1 in order to detect the moment at which the beams 14 and 15 are emitted. The emitted beams 14 and 15 may involve a special signal shape, for example a pulse shape as shown in FIG. 2.

It will be appreciated that the beams 14, 15 and 16, 17 require a given amount of time in order to cover the distance between the transmitter 1, the two target locations 4 and 6 and the receiver 2. Looking now at FIG. 2, the transit time for the beams 14, 16 associated with the upper target location 4 in FIG. 1 is identified by t1 and the time for the beams 15, 17 associated with the lower target location 6 is identified by t2. As the positioning of the transmitter 1 which is stationary at least during the measurement procedure, the positioning of the receiver 2 which is also stationary and the directions of the emitted and reflected beams are known, the measurement in respect of time can be used to draw a conclusion in regard to the camber angle, that is to say the angle of inclination of the wheel 3 relative to a vertical plane. In the same manner, the track angle of the wheel can be determined by irradiating the two target locations 5 and 7 which are disposed on the wheel 3 in a horizontal plane defined by the x- and z-co-ordinate axes. The wheel 3 can stand on rollers (not shown) and be rotated, during the measurement procedure, in the usual fashion in regard to such arrangements.

An oscillator is provided as a time base or frequency standard as indicated at 10 in FIG. 1 for the time measurement operation, and supplies counting pulses by way of a gate circuit 11 to a counter 12. The gate circuit 11 is opened at the beam-emission time s in FIG. 2 so that the counting pulses supplied by the time base 10 are delivered to the counter 12. In that respect, it is possible to provide two channels, wherein the one channel is associated with the beams 14, 16 for the upper target location 4 which is in the 12 o'clock position, and the other counting channel is associated with the beams 15, 17 for the lower target location 6 which is in the 6 o'clock position on the wheel 3. As soon as the reflected beam 16 is received a measuring device 8 which is connected to the receiver 2 produces a corresponding signal at the reception time $e_1$ and delivers that signal at the reception time to the gate circuit 11. That causes closure of the counting channel associated with the radiation directed on to and received from the target location 4, namely the beams 14 and 16.

Upon reception of the beam 17 which is reflected by the target location 6 on the wheel 3 at the reception time $e_2$, the measuring device 9 also supplies a signal to the gate circuit 11 so that the second counting channel is also closed after the expired time $t_2$.

The signal may involve for example pulses of differing amplitude A so that recognition of the signal which is to be used for the time measurement procedure and which is reflected at the respective target locations 4 through 7 can be implemented in an evaluation circuit as indicated at 13 diagrammatically in FIG. 1. For that purpose the evaluation circuit 13 can be connected to the receiver 9. It is however also possible for the receiver 9 to be of such a design configuration that it recognises the emitted and reflected signal form.

The different times t1 and t2 that the two beams associated with the target locations 4, 6 require in order to go from the transmitter 1 to the respective target locations and from there to the receiver 2 correspond to different travel distances which are dependent on the camber angle of the wheel 3. As the directions of the beams 14, 15 and 16, 17 respectively and the positions of the transmitter 1 and the receiver 2 which remain stationary at least during the measuring procedure are fixedly predetermined and known, the camber angle of the wheel 3 can thus be determined in the evaluation circuit 13 which is suitably connected to the counter 2 and into which the above-mentioned fixed data involving the directions of the beams 14 through 17 and the positions of the transmitter 1 and the receiver 2 are inputted for the evaluation operation. In the same manner it is also possible to implement evaluation of the beams which are directed on to the target locations 5 and 7, in order thereby to determine the tracking of the motor vehicle wheel 3. The three co-ordinate axes x, y and z can be used as the reference system, wherein the zero point of that coordinate system is on the wheel axis and, in the ideal situation, that is to say with track equal to zero and camber also equal to zero, the x-axis extends through the 3 o'clock position on the wheel 3 and the y-axis extends through the 12 o'clock position on the wheel 3. The z-axis extends perpendicularly thereto and is on the wheel axis.

The x-, y- and z-co-ordinate axis reference system may also involve a different positioning, but that positioning is also fixedly predetermined in regard to the direction of the beams 14, 15 and 16, 17 respectively and the positions of the transmitter 1 and the receiver 2, and is known for evaluation purposes in the evaluation circuit 13. The position of the wheel 3 mounted on the vehicle is then determined in the evaluation circuit 13 on the basis of the positions, as were obtained from the time measurement procedure, of the target locations 4, 6 and 5, 7 respectively in space with respect to the transmitter 1 and the receiver 2, and the beam directions.

Beams involving different characteristics may be provided for the target locations 4, 6 (camber) and 5, 7 (track) associated with different wheel position angles, so that it is possible for all target locations on the wheel 3 to be irradiated at the same time.

It will be seen from the foregoing description therefore that the invention provides for irradiating the at least two diametral target locations with spatially predetermined irradiation and reflection directions, from a given location, with the reflected beams being received at a given location where the appropriate receiver is disposed. The wheel position angle is accordingly determined from the given positions of the transmitter and the receiver, the predetermined irradiation and reflection directions and the measured beam transit times from emission from the transmitter up to reception at the receiver.

It will be appreciated that the above-described method and apparatus in accordance with the principles of the invention have been set forth solely by way of example thereof and that various modifications may be made therein without thereby departing from the spirit and scope of the invention.

What is claimed is:

1. A method of determining the position of a wheel mounted on a motor vehicle, comprising
    irradiating the wheel by first and second beams aimed at first and second diametrically spaced target locations on the wheel which are associated, respectively, with different given wheel position angles, wherein said first and second beams are emitted at the same time with spatially fixed predetermined irradiation and reflection directions from a transmitter maintained in one stationary position on one side of an axis of the wheel at least during the emission of said first and second beams, and wherein the said first and second beams directed, respectively, to said target locations relating said different given wheel position angles involve different signal characteristics,
    receiving the first and second beams reflected by the target locations on the wheel by a receiver at a given location on an opposite side of the wheel axis, which receiver is in a stationary position at least during the reception of said first and second beams,
    measuring the first and second beam transit times from emission from the transmitter to reception at the receiver, and
    determining the wheel position angle from said given stationary positions of the transmitter and the receiver, the predetermined irradiation and reflection directions and the measured beam transit times of said first and second beams.

2. A method as set forth in claim 1 wherein the emitted beams intended for target locations relating to different wheel position angles have different characteristics.

3. A method as set forth in claim 2 wherein one of said different wheel position angles is the track of the wheel.

4. A method as set forth in claim 2 wherein one of said different wheel position angles is the camber of the wheel.

5. A method as set forth in claim 1 where the emitted beams are of different signal forms.

6. A method as set forth in claim 1 wherein the emitted beams are of different frequencies.

7. A method according to claim 1, wherein said axis of the wheel is a vertically oriented axis.

8. A method according to claim 1, wherein said axis of the wheel is a horizontally oriented axis.

9. Apparatus for determining the position of a wheel mounted on a vehicle, comprising
    a transmitter at a given location for emitting a first beam and a second beam towards at least first and second diametrically positioned target locations with a given spatial orientation, said at least first and second diametrically positioned target locations being disposed on the wheel in association with different given wheel position angles to be determined, wherein said first and second beams are emitted at the same time from a point on one side of an axis of the wheel and remain stationary with spatially fixed predetermined irradiation and reflection directions, and said transmitter is stationary at least during the emission of said first and second beams, and wherein said first and second beams directed, respectively, to said target locations relating to said different given wheel position angles involve different signal characteristics,
    a receiver at a given location on the opposite side of the axis to the wheel for receiving the first and second beams reflected by the respective target locations and for generating a data signal, wherein said receiver is stationary at least during the reception of said first and second beams,
    a beam transit measurement time value generator, and
    an evaluation circuit to receive the measured beam transit time values and the data signal from the receiver and operable to determine the wheel position angle from the positions of the transmitter and the receiver, the directions of the first and second beams and the measured beam transit time values, thereby to determine a position of the wheel on the vehicle.

* * * * *